United States Patent [19]

Breslow

[11] 4,146,978

[45] Apr. 3, 1979

[54] AMUSEMENT DEVICE FOR SPELLING EDUCATION

[75] Inventor: Jeffrey D. Breslow, Highland Park, Ill.

[73] Assignee: Marvin Glass & Associates, Chicago, Ill.

[21] Appl. No.: 825,196

[22] Filed: Aug. 17, 1977

[51] Int. Cl.$^2$ .............................................. G09B 1/20
[52] U.S. Cl. .......................................... 35/77; 46/124; 273/143 R
[58] Field of Search ................. 35/77, 31 A, 35 G, 69, 35/70, 71; 273/143 R; 46/124

[56] References Cited

U.S. PATENT DOCUMENTS

| | | | |
|---|---|---|---|
| 1,470,845 | 10/1923 | Johnson | 35/35 G X |
| 1,889,976 | 12/1932 | Comins | 35/77 X |
| 2,521,775 | 9/1950 | Brower | 35/71 X |
| 2,628,838 | 2/1953 | Smalley | 35/77 UX |
| 2,680,306 | 6/1954 | Moyer | 35/70 X |
| 3,010,227 | 11/1961 | Glass | 35/69 |
| 3,087,258 | 4/1963 | Anderson | 273/143 R X |
| 3,462,857 | 8/1969 | Glass et al. | 35/77 |
| 3,674,905 | 7/1972 | Collins | 35/77 X |

FOREIGN PATENT DOCUMENTS 144505 6/1920 United Kingdom ................. 35/77

Primary Examiner—Harland S. Skogquist
Attorney, Agent, or Firm—Mason, Kolehmainen, Rathburn & Wyss

[57] ABSTRACT

An amusement device for children and the like useful for spelling education includes a toy with a support structure comprising an elongated horizontal shaft extending between opposite end portions which are adapted to rest on a supporting surface and which are fashioned to resemble the head and tail portions of a "bee-like" insect. A plurality of spinner elements are mounted on the shaft between opposite end portions and are adapted for manual spinning on the shaft. Each of the spinning elements is formed with a polygonal shaped centrally disposed opening for accommodating the shaft and a corresponding generally polygonal outer surface having a plurality of outer surface segments, each of which is provided with a selected alphanumeric character. The polygonal openings of the spinners and the outer surface segments thereof are orientated with respect to one another whereby only one of the outer surface segments will remain facing upwardly in a "spell" position after the spinner element is manually rotated and finally comes to rest on the shaft.

4 Claims, 4 Drawing Figures

U.S. Patent  Apr. 3, 1979  4,146,978
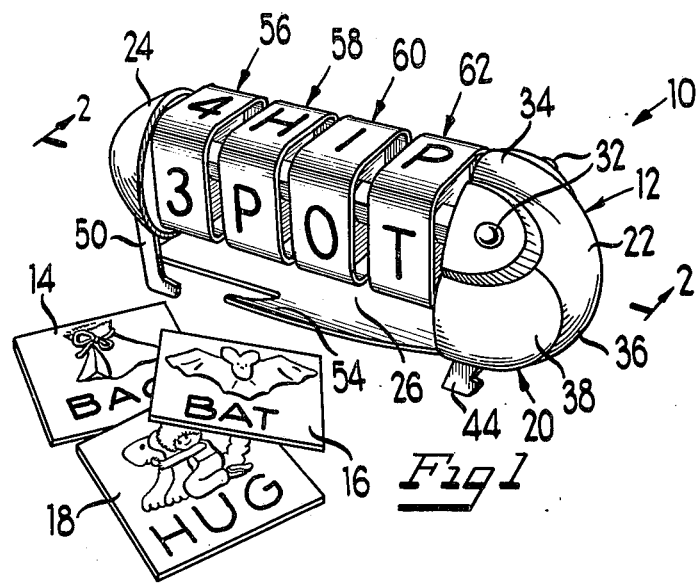
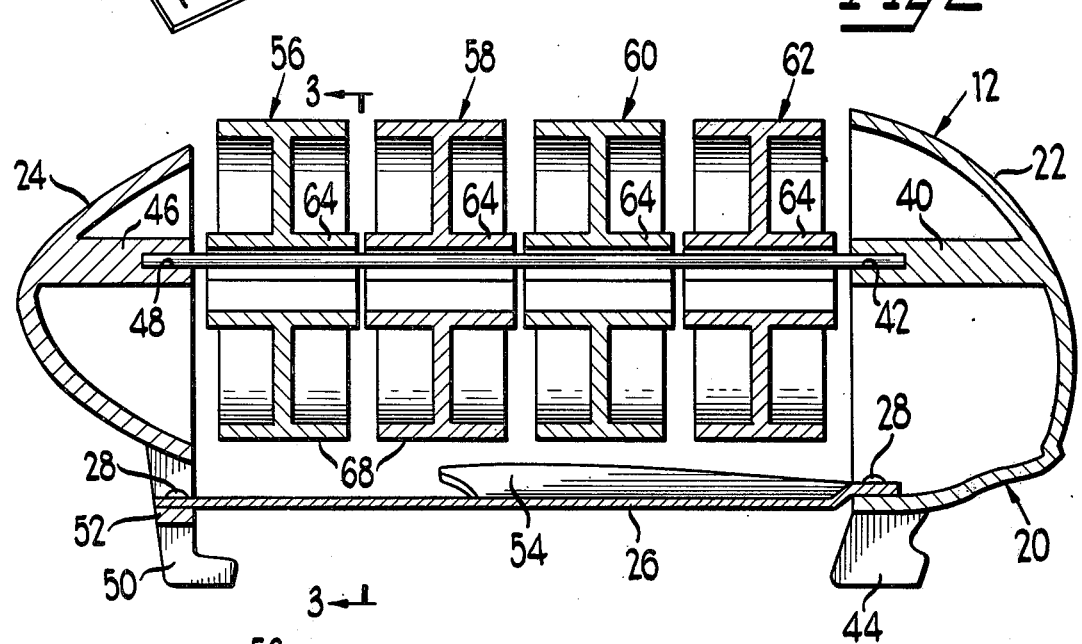
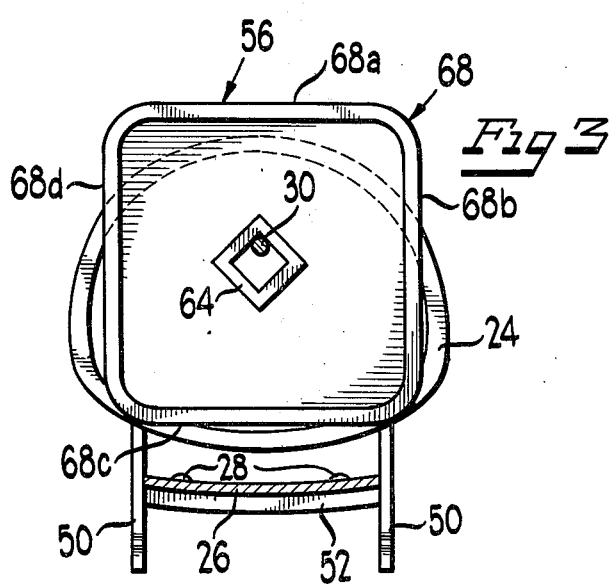
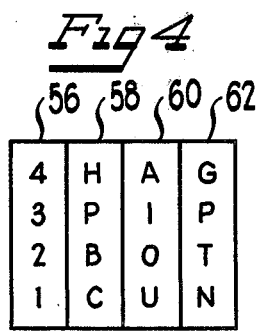

AMUSEMENT DEVICE FOR SPELLING EDUCATION

BACKGROUND OF THE INVENTION

1. Field of the Invention

The present invention relates generally to amusement devices and games and more particularly to amusement devices and toys which are especially adapted for children of tender years.

The present invention provides an educational toy and game which is useful in spelling education and aids a child in the learning process by providing both physical and mental activity for the players. The invention also contemplates a game wherein the amusement device is used with a deck of cards having words to be spelled printed thereon and each player attempts to spell the word on each card in his hand on the device by spinning rotative elements thereof.

2. Description of the Prior Art

Building blocks having alpha-numeric characters on their sides have long been used for aids in spelling education for children of tender years. In addition, various types of toys have been developed to further this purpose and in U.S. Pat. No. 3,010,227 issued Nov. 28, 1961 therein is illustrated and described an educational amusement toy designed for use by a child to help in spelling education. This toy, in addition, generates an audible sound each time it is used to add further interest.

It is an object of the present invention to provide a new and improved amusement device and game for children and the like which is helpful in spelling education.

More particularly, it is an object of the invention to provide an amusement device which is used in a competitive game to provide better and more rapid spelling education.

Another object of the present invention is to provide a new and improved educational/amusement toy of the character described which is rugged and simple in construction, easy to operate, pleasing in appearance, and fun to play with.

Yet another object of the invention is to provide a new and improved spelling education and amusement device of the character described which physically resembles an insect-like character or a "spelling bee."

SUMMARY OF THE INVENTION

The foregoing and other objects and advantages of the present invention are accomplished in a new and improved amusement device and game for children useful in spelling education. The device includes support means having an elongated horizontal shaft extending between opposite end portions which are fashioned to resemble the head and tail portions of an insect such as a "spelling bee." A plurality of spinner elements are mounted on the shaft between the end portions and the spinners are adapted to be manually rotated on the shaft in sequence during a turn. Each of the spinner elements is formed with a polygonal shaped, centrally disposed, opening or hub portion for accommodating the supporting shaft and a generally polygonal, outer surface having a plurality of distinct surface segments. Each outer surface segment has a selected alpha-numeric character thereon. The polygonal openings in the spinner elements and the corresponding outer surface segments are arranged so that after spinning when the spinner elements finally come to rest, one of the outer surface elements will be facing upwardly in a "spell" position and in this position, the supporting shaft is in supportive contact with a pair of the uppermost segments of the hub opening adjacent the apex of intersection. A sequence of letters in the "spell" position provides for spelling of the words. The amusement/educational toy is used in a game with a deck of cards having words to be spelled printed thereon and the cards are dealt out to the players which in turn attempt to spell words by spinning the elements on the toy so that the particular letters on the spinners come to rest facing upwardly in the "spell" position thereby spelling a selected word from a card. The player who first spells the words on all of the cards in his hand is the winner of the game. The toy includes a spinner element having only numeric characters on its outer surface segments and during each turn the players first spin this element to determine by the number appearing upwardly in the "spell" position, how many spins of the other elements they will be allowed during each turn in attempting to spell the words on their cards.

BRIEF DESCRIPTION OF THE DRAWINGS

For a better understanding of the present invention, reference should be had to the following detailed description taken in conjunction with the drawings in which:

FIG. 1 is a perspective view showing a new and improved spelling education/amusement toy for children and the like and several of the spelling cards used therewith;

FIG. 2 is a longitudinal vertical sectional view taken substantially along lines 2—2 of FIG. 1;

FIG. 3 is a transverse vertical cross-sectional view taken substantially along lines 3—3 of FIG. 2; and FIG. 4 is a graphical representation of the alpha-numeric characters provided on the respective outer surface segments of the spinner elements of the toy.

DESCRIPTION OF THE PREFERRED EMBODIMENT

Referring now more particularly to the drawings, in FIG. 1 is illustrated a new and improved amusement game for children of tender years which is helpful in spelling education and which is referred to generally by the reference numeral 10. The game includes a physical toy or device 12 and a deck of cards including the representative spelling cards 14, 16 and 18 which have words printed thereon. The toy or game device 12 includes a support structure 20 (FIG. 2) having a pair of upstanding front and rear support elements 22 and 24 preferably formed of molded plastic material and interconnected at a lower level by means of a tray or bottom element 26 secured to the end supports by rivets or other appropriate fasteners 28. The toy also includes an elongated, cylindrical shaft or rod 30 supported at opposite ends by the end support structures 22 and 24 and spaced in parallel above the lower tray or shelf member 26.

As indicated, the forward end portion 22 of the support structure is shaped to resemble the head portion of an insect such as a "spelling bee" and is formed with a pair of eyes 32, an upper forehead 34, a lower nose 36 and a pair of jowls 38 on opposite sides as shown in FIG. 1. As indicated in FIG. 2, the head end portion is generally hollow and includes a horizontal stem 40 having a recess 42 therein for accommodating the forward end of the shaft or rod 30 which is pressed fitted into the recess. The head end structure also includes a pair of depending legs 44 for supporting the structure on a table, floor or other surface.

Similarly, the rear end portion 24 is shaped to resemble the tail portion of a "spelling bee" or other insect and is also hollow including a central stem 46 having a recess 48 formed therein to receive the rear end of the shaft or rod 30 which is press fitted into the recess. The rear end portion 24 is formed with a pair of spaced apart depending legs 50 and a cross-member 52 extends therebetween for supporting the rearward end of the tray member 26 which is riveted thereto. On opposite sides the tray or shelf is shaped to include a pair of wing-like portions 54 which resemble a pair of insect wings and the wings serve to provide shelf guards for holding the deck of spelling cards like the cards 14, 16 and 18 which are used in the game.

In accordance with the present invention, the toy 12 includes a plurality of manually operated spinning elements 56, 58, 60 and 62 which are mounted in sequence between the end structures 24 and 22 on the shaft 30 as illustrated. Structurally, the spinning elements are identical except for the alpha-numeric indicia or characters provided on the outer segments of the surface thereof. Each spinner includes a hollow, tubular, centrally disposed hub portion 64 of polygonal cross-section as shown in FIG. 3, through which the supporting shaft 30 is extended for loosely carrying the spinning elements thereon. Outwardly of the tubular hub, each spinner includes an integrally formed web, also of polygonal shape similar to that of the cross-section of the hub 64. Around the outer periphery of the web, the spinners include an integral, peripheral flange 68 with an outer surface divided into a plurality of angularly disposed, generally planar, outer surface segments 68a, b, c, and d, respectively, each of which is interconnected with adjacent segments by rounded corners as best shown in FIG. 3.

As indicated in FIGS. 1 and 4, the outer surfaces on each of the segments of the flanges 68 of each of the spinning elements is provided with an alpha-numeric character thereon for use in playing the game and spelling the words on the cards. These characters or indicia may be permanently molded on the spinning elements or may be applied by decals or other means. Because of the polygonal cross-sectional shape of the tubular hub 64 of the spinning elements, each element will always come to rest with the uppermost segments of the inside hub surfaces in contact with the upper surface portion of the shaft 30 as shown in FIG. 3. The outer segments 68a, b, c, and d of each spinning element are oriented with respect to the polygonal shaped hub section surfaces so that when the spinners come to rest, only one of the surface segments will face upwardly as shown in the "spell" position. The spinning elements are symmetrical with respect to a central axis so that when they are spun around on the shaft 30, each one of the outer outer surface segments 68a, b, c, d has an equal chance of coming to rest in the upward facing or "spell" position. The starting position and amount of spinning force applied can be varied by the players in attempting to get a particular letter or number to come up. The spinning element 56 is termed a numeric spinning element in that as indicated in FIGS. 1 and 4, only the numbers 1, 2, 3 and 4 are provided on the respective outer surfaces of the segments 68a, 68b, 68c and 68d, thereof. Accordingly, when a player spins the element 56 and a number comes up into the "spell" position, this number is used to determine the number of spins that the player gets during his turn attempting to spell the words on his cards. As shown in FIGS. 1 and 4, the spinning elements 58, 60 and 62 are provided with selected alphabetic characters or indicia on their surface segments 68a, 68b, 68c and 68d and accordingly, as the letters come up in sequence from left to right in the "spell" position, words are spelled.

In playing the game, each player is dealt a hand of four or more spelling cards 14, 16, 18, etc. from the deck, and then in rotation, the players first spin the numeric spinning element 56 to determine how many spins they will get in their turn. The players then selectively and skillfully spin the elements 58, 60 and 62. As shown in FIG. 1, if the element 58 is positioned with the letter "H" facing upwardly, a player might then attempt to spell the word "HUG" as shown in card 18 by spinning the element 60 and attempting to have the element come to rest with the letter "U" facing upwardly. Once this condition is achieved, the player would use remaining spins of his turn on the last spinning element 62 in an attempt to get the letter "G" to come up in the upwardly facing or "spell" position. In the event a player is not successful in spelling any of the words on his cards during his turn, the next player in the game then starts and repeats the process. The first player in the game spelling all of the words on the cards in his hand is the winner of the game.

The unique design of the spinning elements ensures that the elements will always come to rest after a spin with only one of the surface segments 68a, b, c, d, etc. thereof facing upwardly in the "spell" position thereof for a particular letter or number. In addition, skill and knowledge on the part of the player is utilized and determines how fast to spin an element to successfully obtain a desired letter or number in the upwardly facing or "spell" position. The amusement toy is also pleasing in appearance and serves a dual function both as an educational device and as a physical play toy for children of tender years when not used in the "spelling bee" game. While the toy as illustrated, is provided with a single numeric spinning element and a total of three alphabetic spinning elements, these numbers could be increased if desired and while the respective spinners are shown to have four segments 68a, b, c, and d around the periphery, this number could be reduced to three or increased to five or more as desired to afford a greater variety of words to be spelled.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A game apparatus suitable for use in spelling education to provide a player with a plurality of attempts to spell a word, comprising frame means including an elongated horizontal shaft extending between opposite end portions which are adapted to rest on a surface, first chance means comprising numerical indicating means for randomly dictating a number of player attempts, second chance means comprising alphabetical indicating means for randomly dictating a letter position, and third chance means comprising a plurality of chance elements, each having a plurality of identical alphabetical indicating means thereon in a combination to define a recognizable word, said first and second chance means being mounted on a plurality of spinner elements, each of which is rotatably mounted on said shaft between the opposite end portions and adapted for free manual rotation thereon, each of said spinner elements including means defining a polygonal shaped centrally disposed opening for said shaft and a similarly shaped polygonal outer surface, the outer surface of a first of said spinner elements being provided with said first chance means and the outer surfaces of a plurality of said other spinner elements being provided with said second chance means, whereby the polygonal shape of said centrally disposed opening requires that only one of said first chance means and a plurality of said second chance means are aligned in a predetermined orientation after one or more of said spinner elements is rotated, said means defining said centrally disposed openings including peripheral surfaces which are longer, in the direction parallel to the axis of the shaft, than the length of the outer surfaces of the spinner elements in the same direction to substantially reduce friction between the spinner elements during relative rotation between the same, said end portions being interconnected by a bottom element parallel to said shaft and spaced below said spinner element and said bottom element mounting a plurality of feet extending downwardly of said bottom element, said end portions being shaped to resemble the head and tail portions of a bee-like insect.

2. The game apparatus of claim 1 including a pair of simulated wings secured to said bottom element to further enhance the appearance of the apparatus.

3. The game apparatus of claim 1 wherein the centrally disposed openings are generally square in shape.

4. The game apparatus of claim 1 wherein the polygonal shaped centrally disposed openings are rotated approximately 90° relative to the polygonal outer surfaces of the spinner elements.

* * * * *